United States Patent
Wiest (10) Patent No.: US 7,055,771 B2
(45) Date of Patent: Jun. 6, 2006

(54) TRIP MODE SELECTOR SWITCH FOR SPINNING REEL

(75) Inventor: Timothy A. Wiest, Hegins, PA (US)

(73) Assignee: Penn Fishing Tackle Manufacturing Co., Philadelphia, PA (US)

(*) Notice: Subject to any disclaimer, the term of this patent is extended or adjusted under 35 U.S.C. 154(b) by 978 days.

(21) Appl. No.: 10/095,757

(22) Filed: Mar. 11, 2002

(65) Prior Publication Data

US 2005/0006511 A1  Jan. 13, 2005

Related U.S. Application Data

(60) Provisional application No. 60/279,462, filed on Mar. 26, 2001.

(51) Int. Cl.
*A01K 89/02* (2006.01)

(52) U.S. Cl. ...................... 242/244; 242/246
(58) Field of Classification Search ......... 242/244–246
See application file for complete search history.

(56) References Cited

U.S. PATENT DOCUMENTS

| | | | | |
|---|---|---|---|---|
| 4,714,208 A | * | 12/1987 | Holahan et al. | 242/288 |
| 4,746,077 A | * | 5/1988 | Toda | 242/245 |
| 5,816,516 A | * | 10/1998 | Yamaguchi | 242/246 |
| 5,865,386 A | * | 2/1999 | Tao | 242/246 |
| 6,039,278 A | * | 3/2000 | Tao | 242/246 |

* cited by examiner

*Primary Examiner*—Emmanuel M Marcelo
(74) *Attorney, Agent, or Firm*—Frank J. Benasutti (57) ABSTRACT

A two-drag mode, front and rear configuration spinning reel has a trip mode selector switch means. This switch means lets the reel be used in the free spool shaft condition to rotate a rotor frame and take up line upon turning the handle, without automatically shifting the device into the condition of a locked up spool shaft. The switch also allows for both the automatic and manual modes at the preference of the user.

9 Claims, 14 Drawing Sheets

TRIP MODE SELECTOR SWITCH FOR SPINNING REEL

CROSS REFERENCE TO RELATED APPLICATION

This application is a continuation-in-part of my prior co-pending provisional patent application No. 60/279,462, filed Mar. 26, 2001, which is incorporated herein as if fully set forth.

BACKGROUND OF THE INVENTION

1. Technical Field

This invention relates to spinning reels and, more particularly, to a spinning reel having a dual drag system operable between automatic and manual modes.

2. Description of the Art

In the prior art, a standard spinning reel typically uses a single drag system. For certain types of fishing conditions, it is preferable to have two separate and adjustable drag systems. Generally, the primary drag is heavy and the secondary drag is light. The light drag is set to let the bait fish swim with the line. It also allows the game fish to run with bait without feeling drag. Once a fish has taken the bait, the heavy drag is needed to set the hook and reel in the fish. The reel must be switched from light drag to heavy drag.

Currently, there are two types of systems used to switch between light and heavy drag. One type is to manually trip or slide a lever to engage the heavy drag. With this style, once a fish has taken the bait, a manual lever must be tripped by hand; then the reel handle must be turned to reel in the fish.

The second type is to employ a tripping mechanism which automatically engages the heavy drag by turning the handle of the reel. At times, this is considered to be more convenient than the manual type.

There is one major inconvenience of the automatic trip type. While fishing, slack in the line may need to be taken in by turning the handle. Depending on the conditions, this might be done quite often. A reel with the automatic feature will need to be reset to the light drag mode constantly, because it will trip to the heavy drag mode every time the handle is turned. Also, this is undesirable because any fish biting during this transition could be lost, as the reel would no longer be in the light drag mode needed when the fish takes the bait. In these conditions, the manual trip mechanism is more convenient.

Prior art patents for such mechanisms in spinning reels are shown in U.S. Pat. No. 4,746,077, dated May 24, 1988, for a control device for a drag mechanism in a spinning-type fishing reel, and U.S. Pat. No. 6,039,278, dated Mar. 21, 2000, for a spinning reel for fishing.

The '278 patent shows a spinning reel in which the spool 16 is mounted on the shaft 17 at the front of the reel. Also at the front, the main or heavy drag controls the rotation of the spool on the spool shaft.

Figure 1:
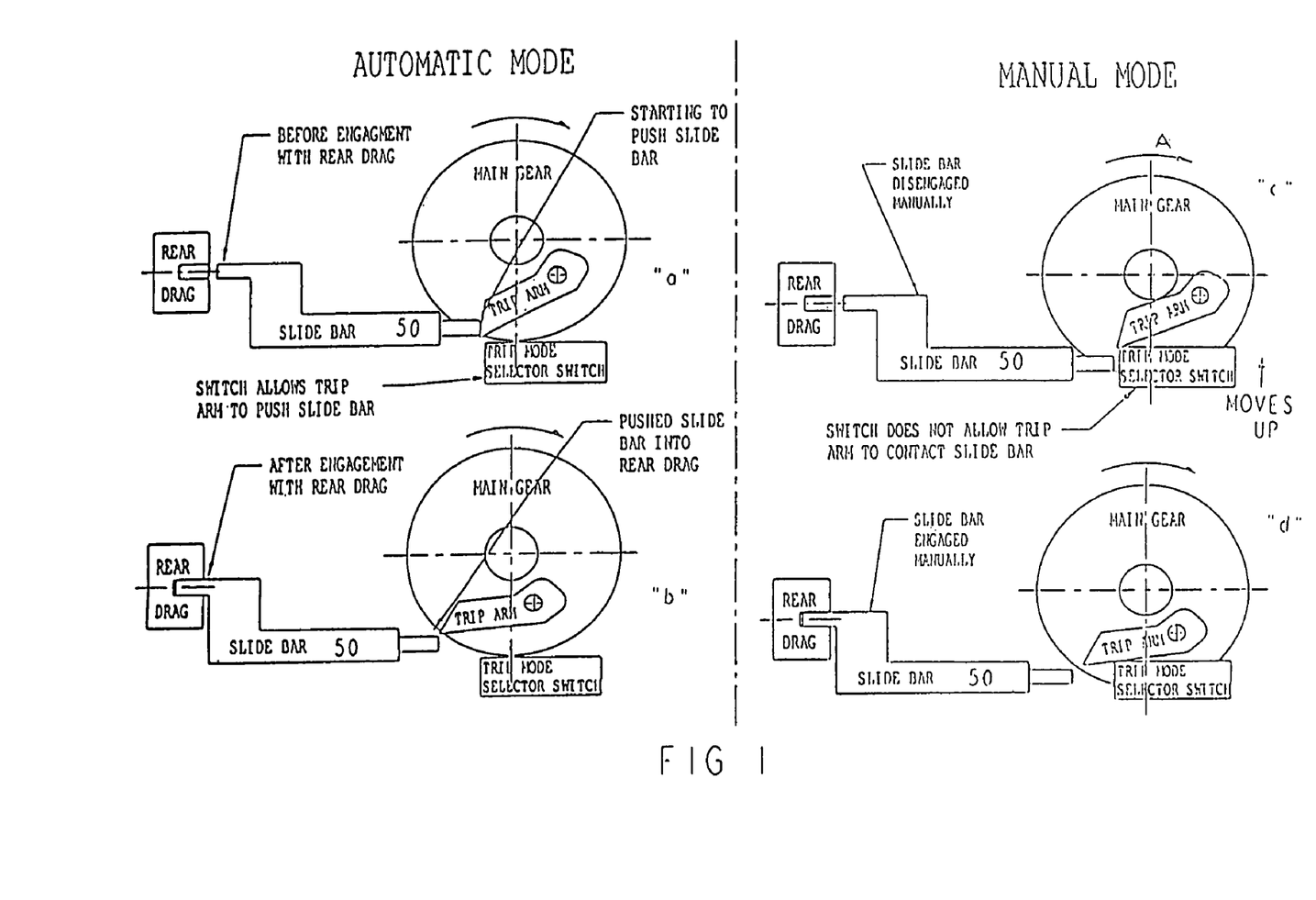
FIG. 1 is a combined diagrammatic view, showing and comparing alternate modes of the spinning reel in accordance with my invention.

At the rear, a rear or light drag assembly 23, FIG. 1, can apply some drag to the spool shaft. This would be a light drag as opposed to the heavy drag accorded by the main drag in the front.

A plate 50 moves within the body of the reel to control the drag that is being used. In the position (identified as position II) shown in solid lines in FIG. 4, the plate 50 is in a stable condition wherein the spinning reel is in a free spool shaft condition. In this condition, the spool, which is mounted on the spool shaft 17, rotates easily; and hence, pulling fishing line from the spool is easy and provides little resistance. To prevent the spool from moving too freely, the adjustable drag assembly 23 at the rear provides a light adjustable drag force in this condition.

However, if the plate 50 is moved to the left to the phantom position (identified as position I) so that the protrusion 56 on the plate 50 fits into a notch 42, the block 40 cannot rotate and therefore neither can the shaft spool 17; which is rotationally fixed in relation to the block 40. This position is known as the normal drag condition in which heavier drag can be applied, such as after the fish has taken the hook on the cast line. This condition can be obtained by either pushing a flip lever to move the plate 50 to position I, or by turning the main gear 80 in the direction of the arrow C in FIG. 4. When this occurs, the end surface 84 of a claw 82 contacts protrusion 58 on plate 50 and moves it from the position shown in solid lines in FIG. 4 to the position shown in phantom lines at 58 I. Thus, this mechanism provides an automatic way of moving to the heavy drag condition by simply rotating the handle of the reel.

In accordance with this device, there are two conditions arrived at as follows:

First, one can manually engage and lock up the spool shaft so that it cannot turn. The phantom condition I allows only the heavy front end drag to deter rotation of the spool; or this can be done automatically by rotating the handle and thus causing the claw to engage and slide the plate 50. Note, however, that this happens every time the fisherman turns the handle.

Figure 4:
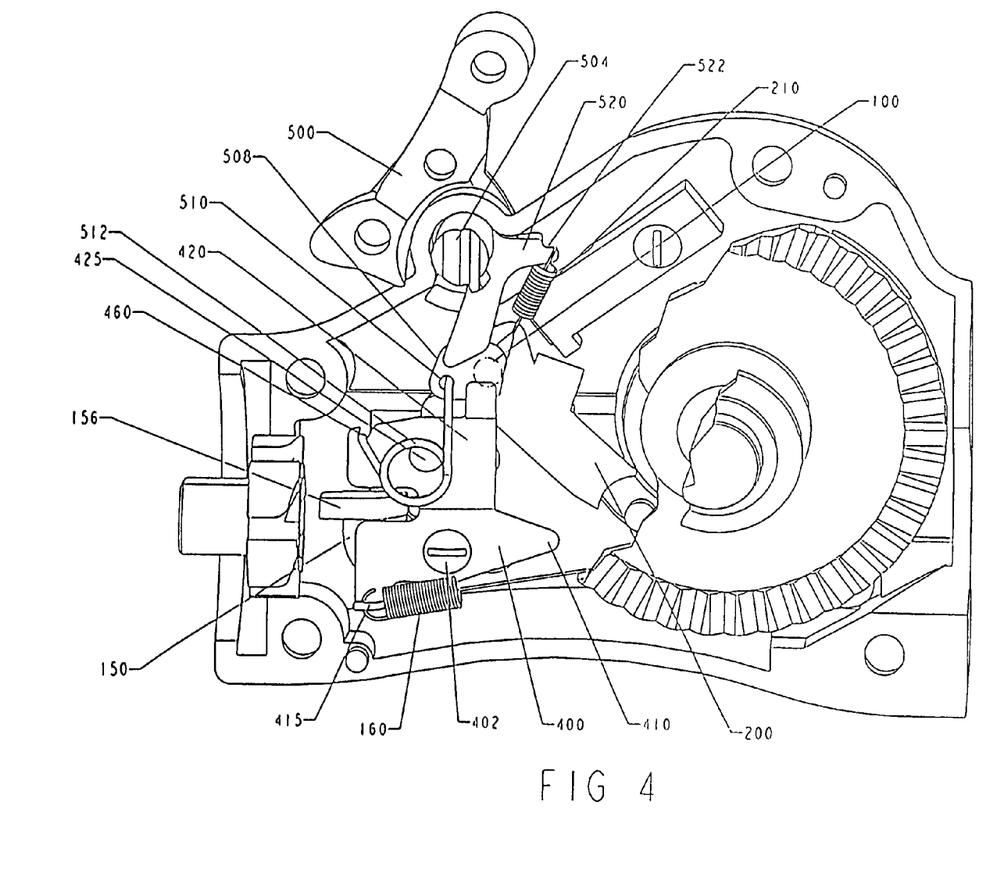
FIG. 4 is a perspective view partially broken away of a portion of a spinning reel in accordance with my invention.

The other condition is to move the lever manually and thus move the plate 50 to the right, when viewed as in FIG. 4, to move the device into the free spool shaft condition.

Therefore, the two conditions are either to move the plate manually to lock the spool shaft or unlock it, or move it automatically to lock the spool shaft. One cannot move it to an unlocked condition wherein the reel handle could be used to take up slack in the line, since rotating the handle would automatically lock up the spool shaft.

With the spool shaft locked up, the spool is stationery. When the handle of the reel is turned, it turns the main gear drive shaft. This turns the rotor which rotates around the stationery spool which is mounted on the spool shaft. Since the spool shaft is locked to the spool, there is an adjustable amount of drag which still allows the spool to be turned and the line to be drawn off.

DISCLOSURE OF THE INVENTION

SUMMARY OF THE INVENTION

My invention is an improved two-drag mode, front and rear configuration spinning reel that has the conveniences of both automatic and manual trip modes without the inconveniences. This is accomplished by installing a trip mode selector switch means. This switch means lets the reel be used in the free spool shaft condition to rotate the rotor and take up line upon turning the handle, without automatically shifting the device into the condition of a locked up spool shaft. The switch also allows for both the automatic and manual modes of the prior art. As a result, an angler can easily change drag modes to satisfy different conditions or preferences.

I have invented improvements in a spinning type fishing reel, having at least a spool shaft and a spool mounted thereon, a crank to turn a rotor frame around the spool and reel in a fishing line onto the spool, and a drag means to apply drag to the spool, said reel also having at least the following modes of operation:
- a. a free spool shaft operative mode; and
- b. a locked spool shaft operative mode wherein the spool shaft is locked, but there is an adjustable amount of drag which may be placed on the spool between the spool and the spool shaft; and
- a switch means which can be tripped manually to put the reel in the free spool shaft operative mode or the locked spool shaft operative mode; and
- an automatic actuating means to automatically put the spool shaft in the locked spool shaft operative mode upon rotation of the crank, the improvement comprising:
- a trip mode selector switch means for disengaging the automatic actuating means and allowing the reel to be cranked to reel in line in the free spool shaft operative mode.

In the preferred embodiment, the reel has a light adjustable drag means to apply drag to the spool shaft in the free spool shaft operative mode.

In one embodiment, the reel has a trip mode selector switch means comprising a sliding switch means. In another embodiment, the trip mode selector switch means comprises a rotational switch means.

I have also invented an improvement in a spinning reel for fishing, comprising:
- a casing;
- a main gear;
- a handle shaft arranged to turn the main gear of the reel;
- a spool shaft defining a first axial end and a second axial end, said spool shaft being reciprocal in an axial direction; a spool provided at said first axial end of the spool shaft mounted on the spool shaft by a front drag assembly, and a block fixed rotationally with respect to the spool shaft and located at the second axial end of the shaft, opposite to the first axial end;
- a rotor for winding fishing line onto said spool;
- a switching means for selectively engaging the spinning reel between a first state being a main drag condition, in which the spool shaft is prevented from rotating relative to the casing, and a second state being a free spool shaft state in which the spool shaft may be substantially free to rotate;
- the switching means including a switch mechanism, said switch mechanism including a plate which is mounted to move parallel to the axial direction of the spool shaft, between a first and a second stable position, said plate defining an engagement means at one of its ends;
- wherein when said switch mechanism is in the first of the two stable positions, the engagement means engages with a mating engagement means in the block to prevent rotation of the block and the spool shaft relative to the switch means and the casing to cause the spinning reel to be in the main drag condition; and
- wherein the switch mechanism is movable to the second stable position in which the engagement means is disengaged from the mating engagement means in the block, and the block and spool are free to rotate relative to the switch means to cause the spinning reel to be in the free spool shaft state; and further comprising
- a return means associated with the main gear of the reel for switching the spool from the free spool state to the main drag condition when the handle shaft is rotated in a direction to reel fishing line onto the spool; the improvement comprising:
- a trip mode selector switch means for disengaging the automatic function means and allowing the reel to be cranked to reel in line in the light drag mode.

In accordance with one embodiment of my invention I have provided an improvement in a spinning type fishing reel having:
- a reel body;
- a rotary frame supported rotatably to said reel body;
- a spool supported on a spool shaft;
- a drag mechanism for applying a resistance against rotation of said spool on said shaft;
- a changeover control mechanism for changing over said drag mechanism between an operating state in which said spool is subjected to a rotational resistance applied by said drag mechanism and a free spool shaft state to enable said spool to be freely rotatable;
- a return mechanism which, when said drag mechanism is released from said operating state, automatically restores said changeover control mechanism from a condition causing said drag mechanism to occupy said operation releasing state to a condition causing said drag mechanism to occupy said operating state, following rotation of said rotary frame;
- a master gear for driving said rotary frame;
- at least one kick member rotatably driven together with said master gear; the improvement comprising:
- a trip mode selector switch means for disengaging the automatic restoration and allowing the reel to be cranked to reel in line in the free spool shaft state.

DESCRIPTION OF THE PREFERRED EMBODIMENTS

Referring to the Figures, FIG. 1 shows schematically both the automatic and manual modes and the action of my trip mode selector switch means as it might be applied to the prior art device shown in U.S. Pat. No. 6,039,278. As set forth above in the description of the apparatus disclosed in that patent, a slide bar 50 can be moved either automatically, as shown in the comparison between position "a" and position "b", or manually, as shown in the comparison of positions "c" and "d" into engagement with the rear drag. In this context, my trip mode selector switch means may be introduced to move the trip arm out of the way, so when the main gear is rotated in the direction of the arrow A, the trip arm will not engage the slide bar. Thus, the slide bar would remain in the condition shown in FIG. 1 "c".

The details of the means and mechanism for performing these functions will be described hereinafter.

Figure 2:
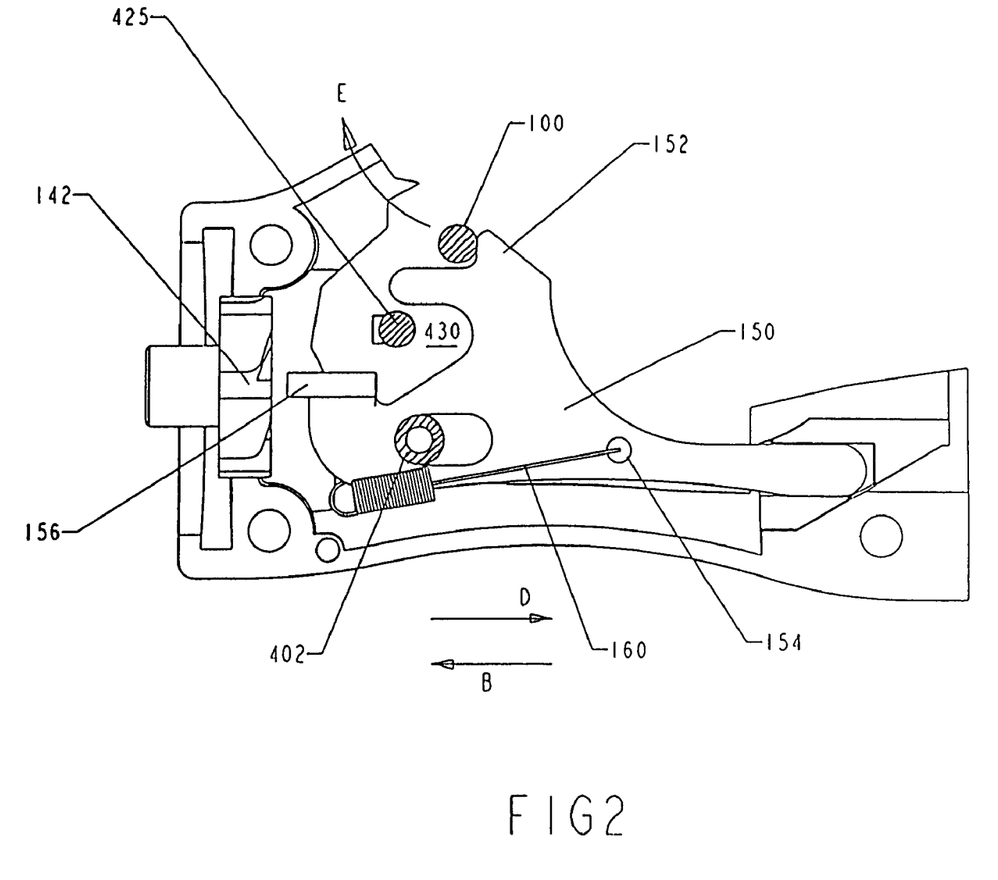
FIG. 2 is a longitudinal section partially broken away of a portion of the preferred embodiment of my invention.

Referring to FIG. 2, a portion of the fishing reel in accordance with my invention is shown partially broken away and partially in section to illustrate certain parts. In particular, the slide bar 150 is mounted in the frame of the reel, so as to move in the direction of the arrows B and D. In the position shown in FIG. 2, it has moved as far to the right in the direction of the arrow D as is permitted by the confines of the reel. In that position, if the stud 100 was rotated out of the way, such as in the direction of the arrow E, so that it no longer interfered with the protrusion 152, the slide 150 would be moved to the left in the direction of the arrow B by virtue of the urging of the coil spring 160, which is under tension and is connected thereto by means of engaging one end of the spring with a hole 154. The other end of the coil spring is hooked to a stationary part to be described more fully hereinafter. The spring is constantly maintained under tension so that it is always trying to urge the slide 150 to move to the left.

Once the slide is moved to the left, the protrusion 156 can engage the notch 142 and lock up to the core block within the rear drag (as noted in the prior art).

Figure 3:
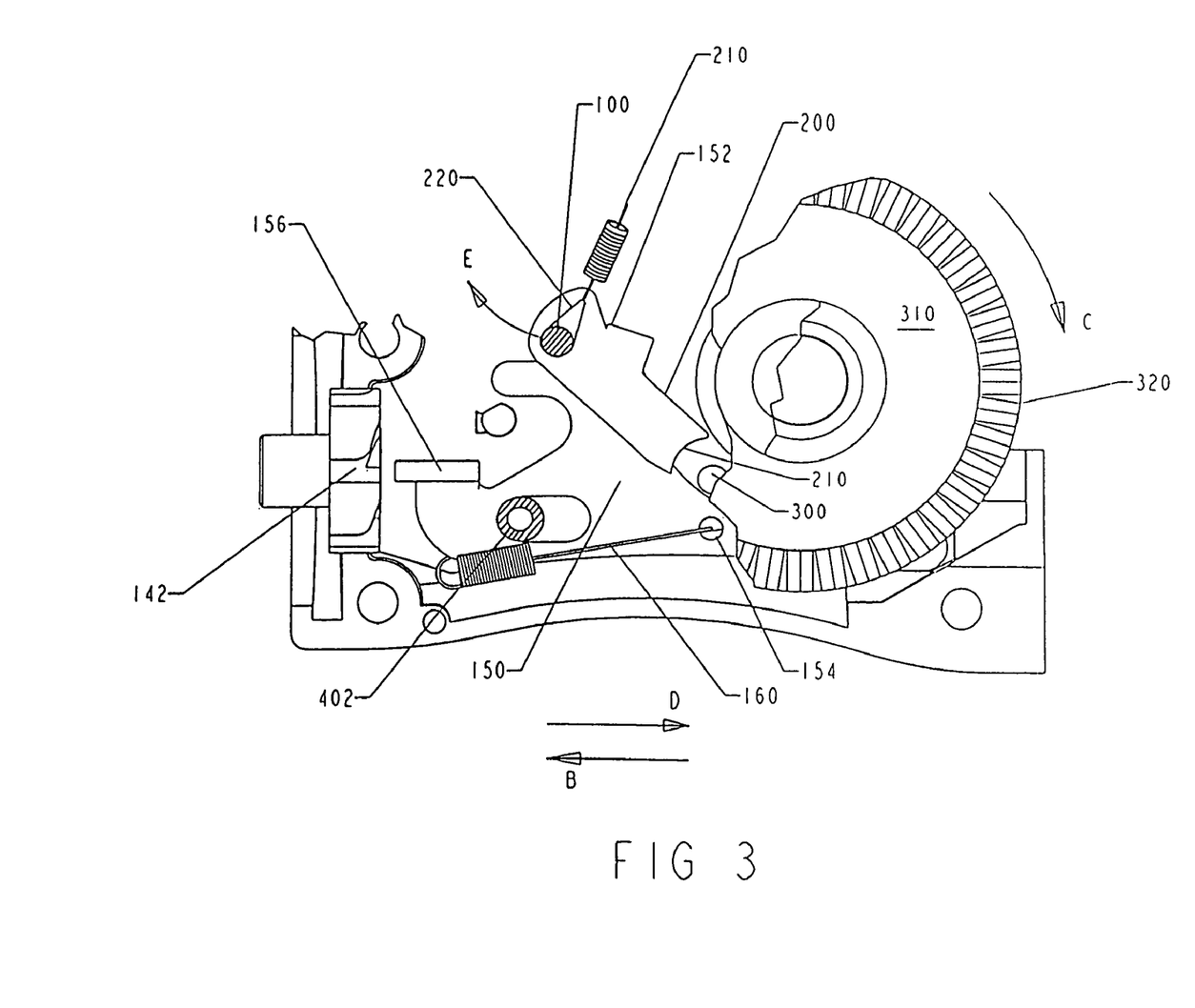
FIG. 3 is a longitudinal section partially broken away of a portion of the preferred embodiment of my invention.

One method and means of moving the stud 100 out of interference with the plate 150 is to use a lever 200, FIG. 3. The lever has a concave distal end 210 to engage a pin or kick member 300 on the inner or opposite face of the gear 320 from the face 310 of the gear 320 when the gear is turned in the direction of the arrow C. Thus, as the gear continues to rotate in the direction of the arrow C, the pin forces the lever 200 to move the stud 100 in the direction of the arrow E. To maintain its orientation, a coil spring 210 is provided under tension and engaged with the V-shaped end of the teardrop shaped hole 220. The other end of the coil spring 210 is connected to another part which will be described hereinafter. Thus, it will be appreciated that the functioning of this arrangement is such that when the reel is rotated by the handle (not shown), the pin will engage the lever 210 and automatically release the plate 150, so that it can slide to the left and engage the notch 142. This will look up the spool shaft.

In order to retain the parts and control movement, I provide a plate 400, FIG. 4, overlying the parts 150 and 200 in the following manner. The first section of the plate having the nose 410 overlies the member 150, but is in the same plane as the member 200. The second portion 420 of the plate 400 overlies the member 200. The plate 400 is held in position by the screw 402; the shaft of which is shown in FIGS. 2 and 3. The shaft passes through the number 150 and is fastened into the frame of the reel.

Figure 5:
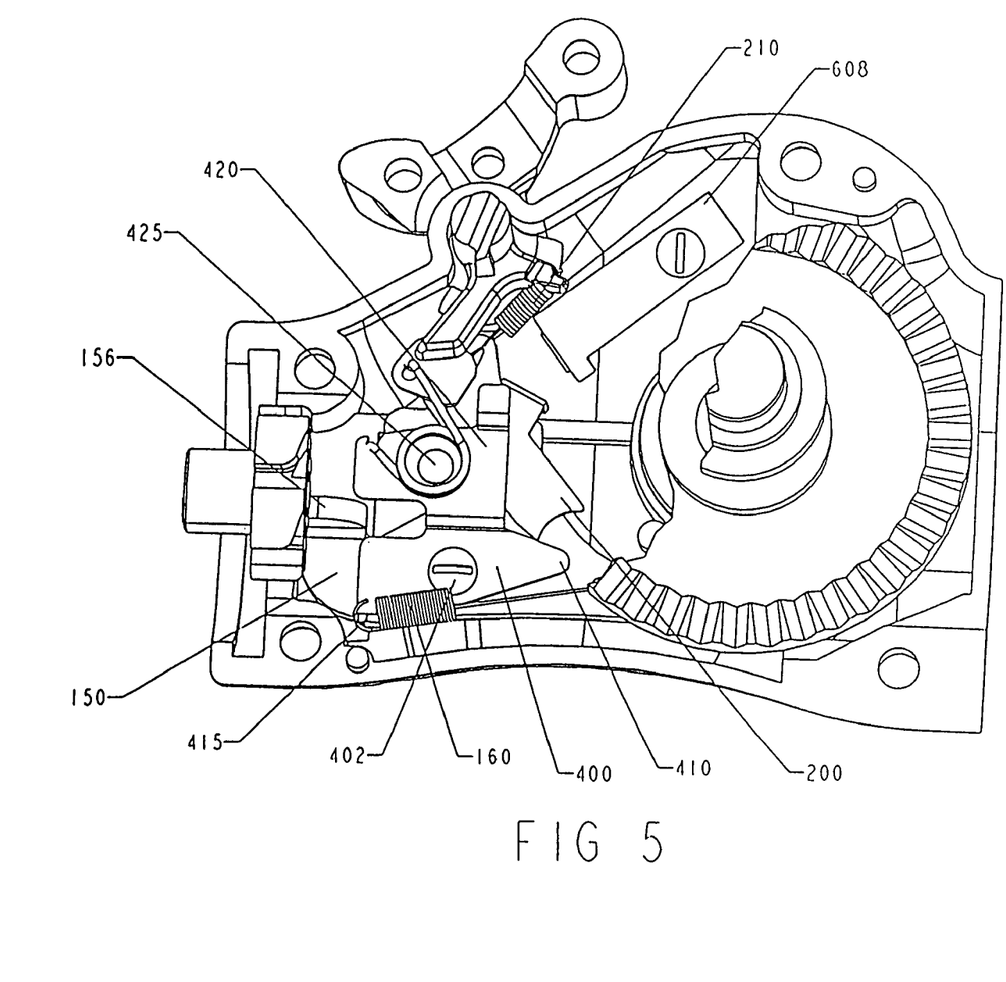
FIG. 5 is a perspective view partially broken away of a portion of a spinning reel in accordance with my invention.

In operation, as the part 200 moves the stud 100 in the direction of the arrow E in FIG. 2, it translates from the position shown in FIG. 4 to the position shown in FIG. 5 and thus engages the nose 410 and moves up that nose which is interfering with its translated movement to the left when viewed in those Figures. Thus, it rides up the slope of the nose 410 like a follower on a cam. Note that at the same time, the part 150 moves to the left into engagement with the notch. As this translation of the part 200 occurs, it passes under the portion 420 of the plate 400.

The plate 400 also has an upwardly extending tab 415 with a hole in it through which the other end of the spring 160 is fastened. The stud 425 is mounted through the portion 420 and is fastened into the frame of the reel to maintain the position of the plate 400. The clearance space 430, FIG. 2, is provided in the part 150 in order that the part 150 clears the stud 425 during its travel to the left.

The automatic actuating means described automatically puts the spool shaft in the locked operative mode upon rotation of the crank.

Figure 6:
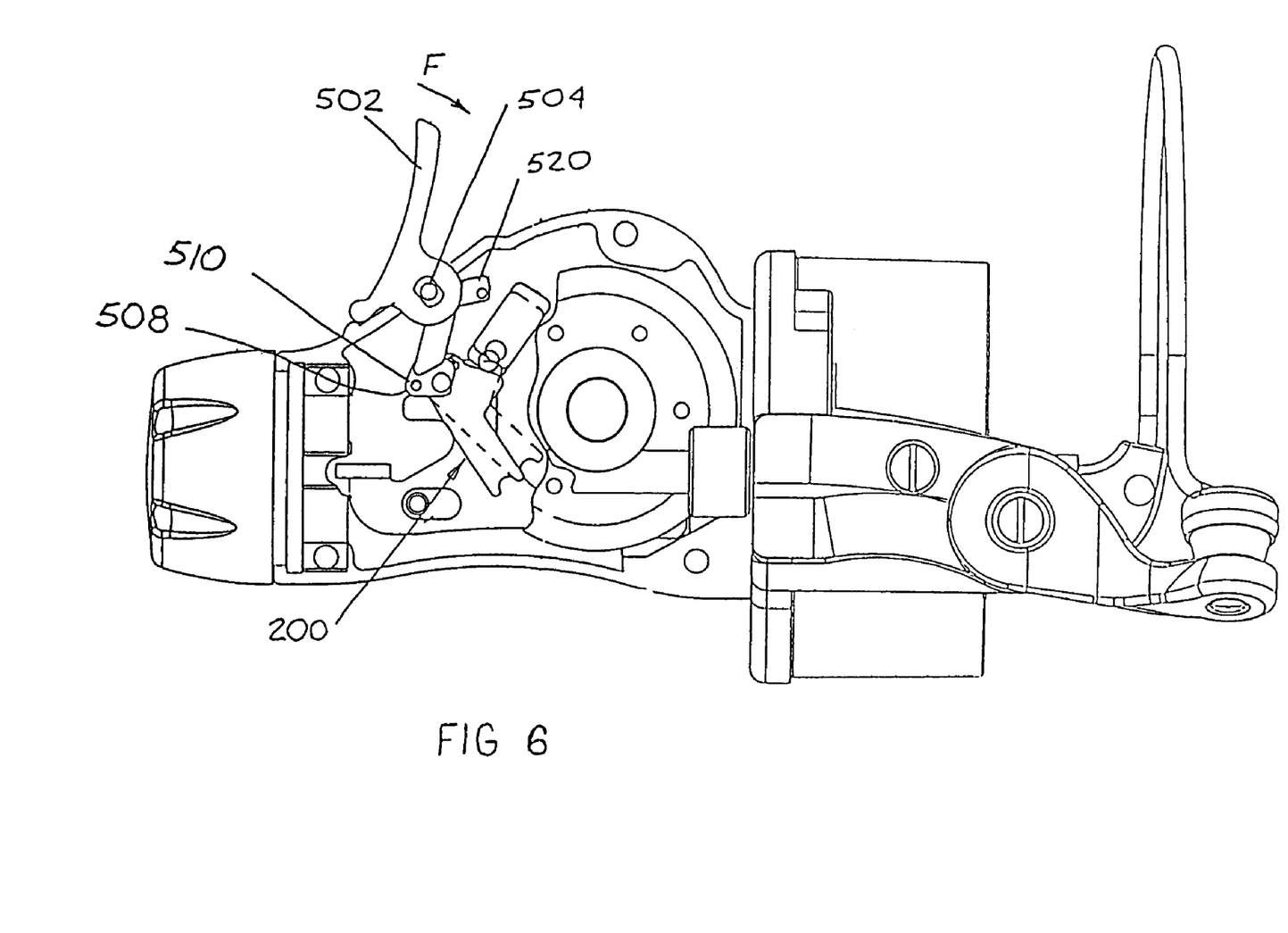
FIG. 6 is a sectional view partially broken away showing an alternate position of a portion of spinning reel in accordance with my invention.

An external manual switch means is provided to switch the device out of the mode in which it would be acted upon automatically and into the locked mode which locks up the spool shaft. The switch means also operates manually to reverse this condition, that is, moving from the locked spool shaft position back to the position in which the device would operate automatically. That switch means is 500, FIG. 4. It comprises a trip lever 502, FIG. 6, mounted on a shaft 504, which is mounted to be rotatable about its axis, to the reel frame.

Within the frame or casing of the reel and preferably as part of the shaft 504, I have configured arms extending from that shaft and fixed to it for movement therewith. One of those arms is an eccentric lever arm, FIG. 6. At the end of that lever arm, there is an irregularly shaped portion 508. This portion is mounted to overlie the part 200 as shown in FIG. 4. A hole 510 is provided therein to retain one end of a coil spring 512. The other end of the coil spring is retained in a notch 460 in the plate 400 as shown in FIG. 4.

Also preferably formed as part of the shaft 504 for rotation therewith is an arm 520 extending therefrom and having a notch 522, FIG. 4, therein for engaging and retaining the other end of the spring 210.

The effect of this arrangement is to provide two stable conditions. In the condition shown in FIG. 4, the effect of the heavier coil spring 512 is to retain the trip lever 500 in the position shown. When that trip lever is acted upon in the direction of the arrow F in FIG. 6, the mechanism flips to the position shown in FIG. 5. In that position, the spring 512 will likewise retain the lever in that position. The spring 512 acts in much the same way as a hairpin spring would act in a similar condition. The additional coils are placed in it to make the spring last longer. However, the effect is the same, namely, in the condition shown in FIG. 9, the spring would force the part to rotate counterclockwise with respect to the shaft 504; and in the condition shown in FIG. 10, the spring would urge the part 508 in a clockwise direction about the shaft 504.

Note in FIG. 4 that the stud 100 is shown in dotted lines in that it extends from the under side of the portion 508 into the teardrop-shaped hole 220, FIG. 3 to function as aforesaid. That is, when the lever is flipped from the position shown in FIG. 4 to the position shown in FIG. 5, the stud 100 retracts the member 200.

In accordance with my invention I provide a trip mode selector switch means for disengaging the automatic actuator means and allowing the reel to be cranked to reel in line in the free spool operative mode.

Figure 7:
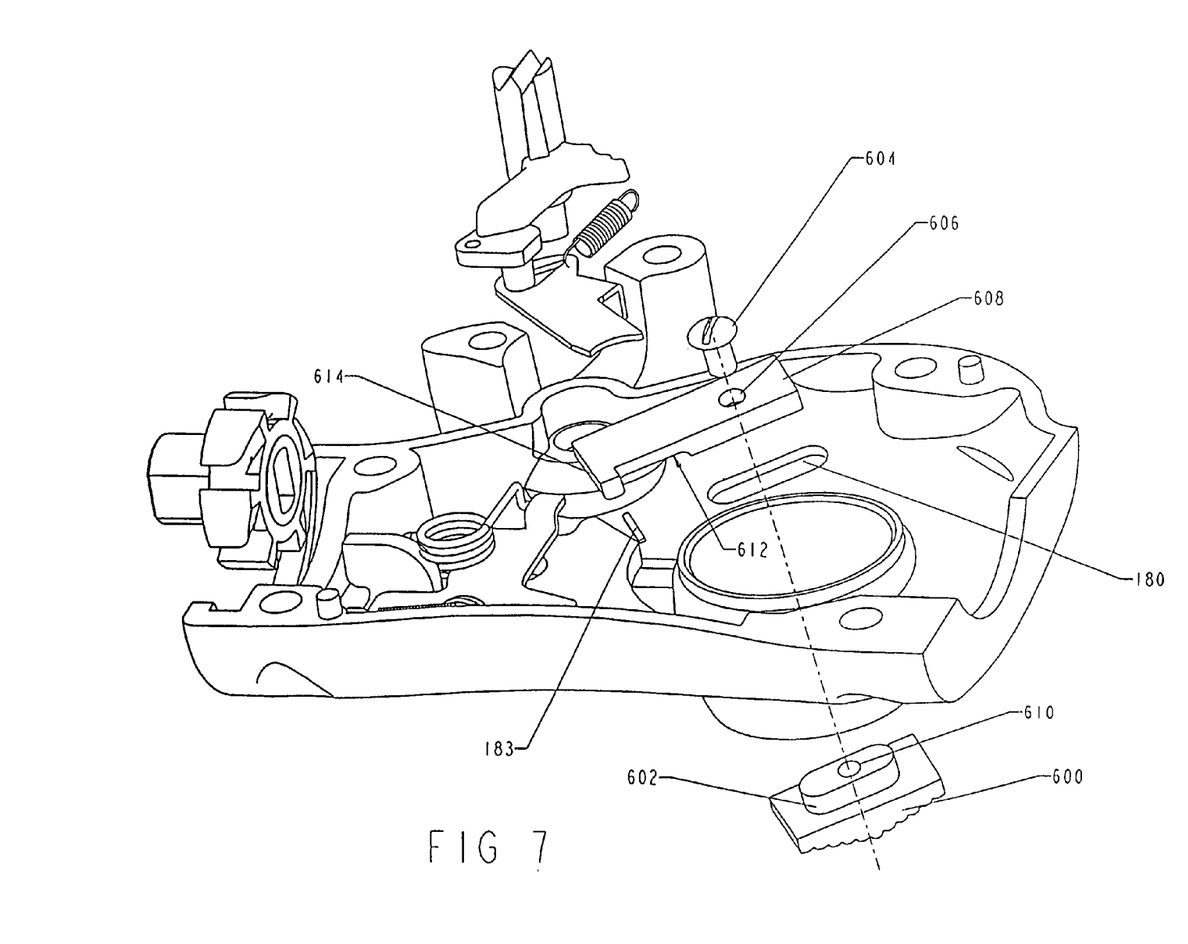
FIG. 7 is a perspective view partially broken away and exploded of a spinning reel in accordance with my invention.

The finger switch portion of the trip mode selector switch means is mounted on the outside and passes through to the inside of the casing or frame of the reel. This is shown in the partially exploded view, FIG. 7, and comprises a manually operable external switch portion 600, having a boss 602 which is oval-shaped to meet with and fit within an oval-shaped slot 180 in the reel frame. The slot is longer than the length of the oval-shaped boss 602, so that the boss can move within that slot. The switch is retained by a screw 604 which passes through a clearance hole 606 in a clip 608 and is threaded into the hole 610 in the boss 602. When the screw is drawn down, the clip 608 is flush against the inside of the casing or frame of the reel as, for example, is shown in FIG. 5. A portion of the body of the clip 608 is relieved or undercut as shown at 612, FIG. 8, to provide some flexibility in that portion which extends beyond the contact area with the part 608 against the inside of the frame or casing of the reel. This clip 608 is preferably made of plastic. Thus relieving a portion of it, allows it to flex. The undercut portion stops short of the end at 614, FIG. 8. Thus, when viewed from the side as in FIG. 8, the undercut portion 612 terminates at one end in a shoulder at 614. This shoulder is designed to ride up and over the lateral protrusion 183 formed on the inner surface of the casing or frame of the reel as shown in FIGS. 7 and 8.

Figure 8:
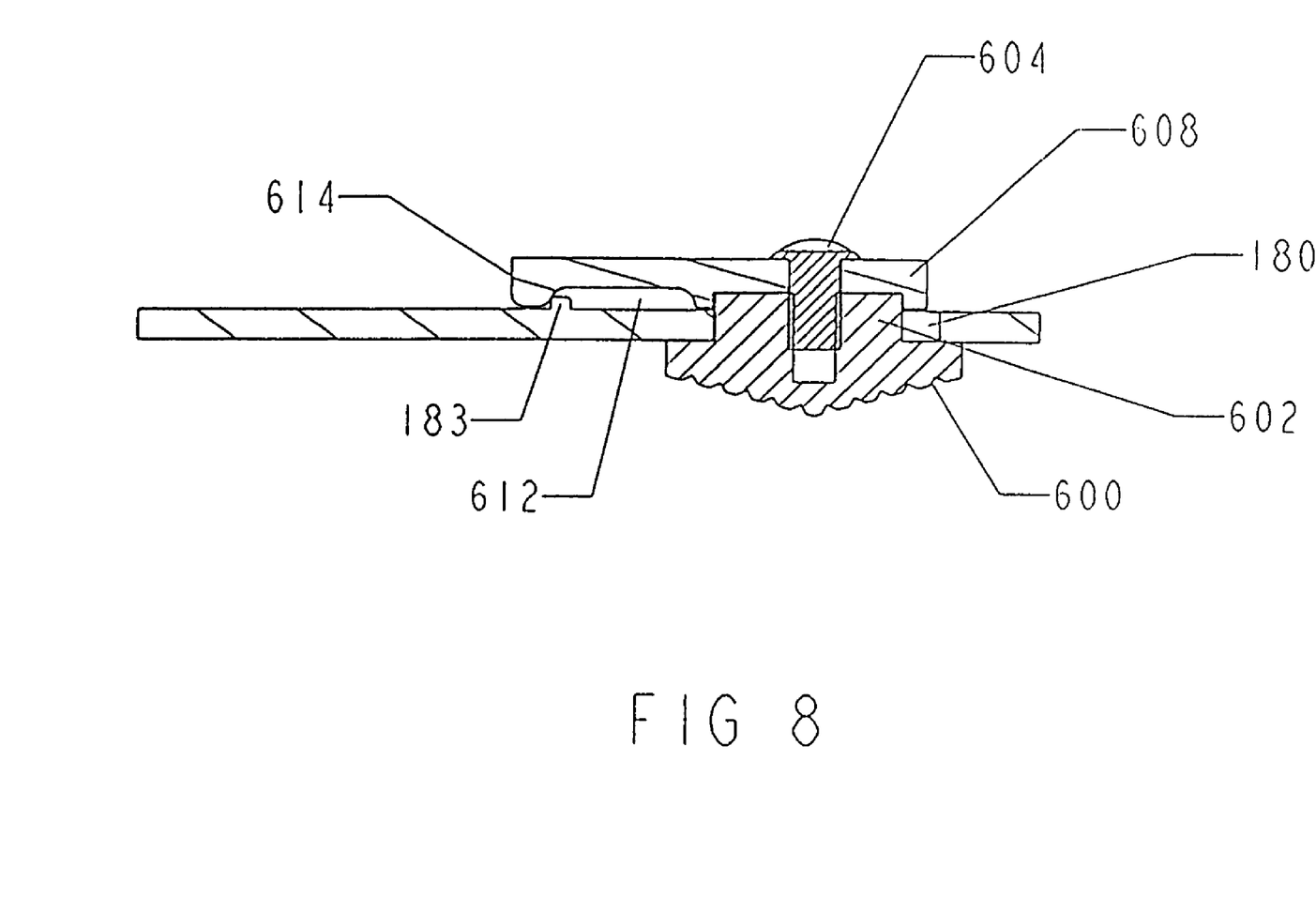
FIG. 8 is a sectional view of a portion of a spinning reel in accordance with my invention.

In the position shown in FIG. 8, the clip 608 is moved toward the back of the reel and the portion 614 has gone up and over the bump 183 in the housing of the reel to hold the switch 600 in the rear or back condition. When the switch is moved to the right, it goes up and over the protrusion 183.

Figure 9:
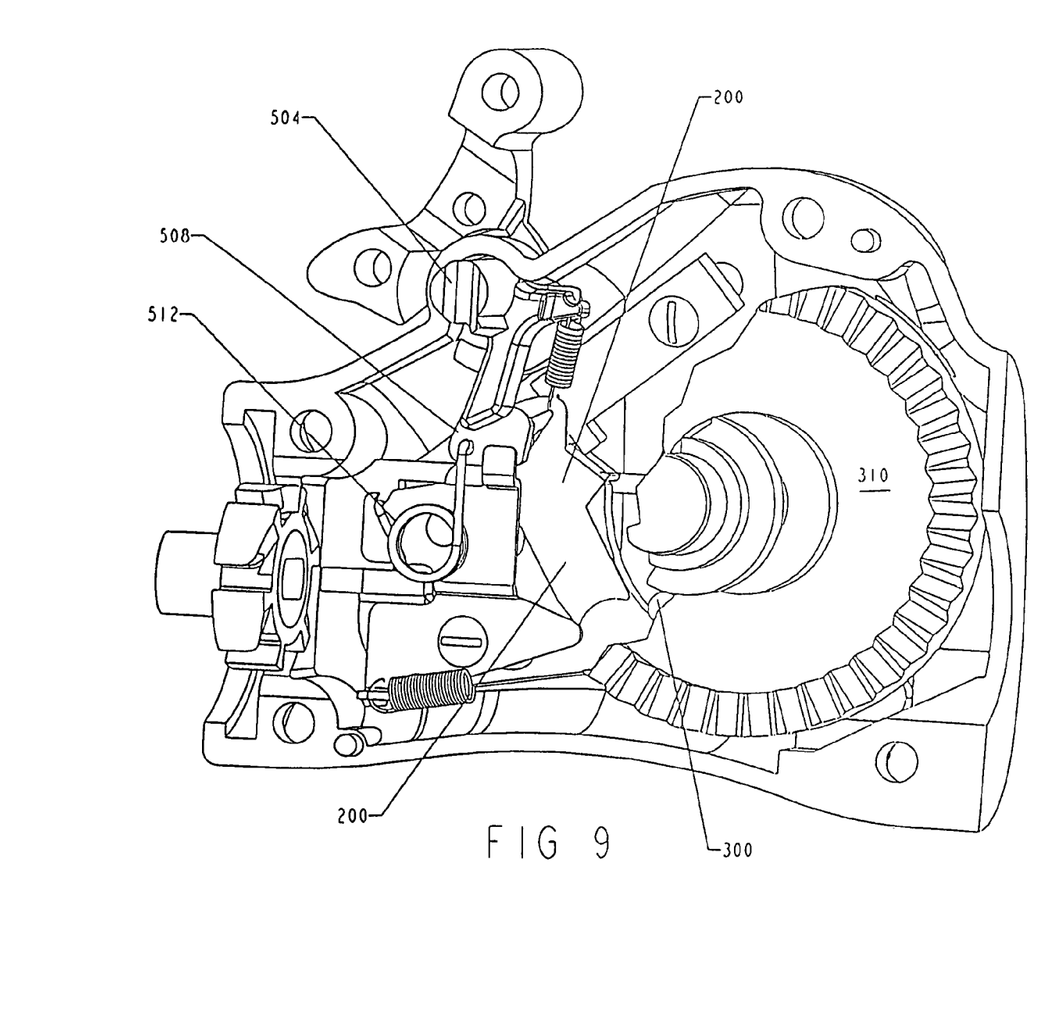
FIG. 9 is a sectional view of a portion of a spinning reel in accordance with my invention.

When it is moved to the left, as shown in FIGS. 8 and 9, it interferes with the member 200 preventing that member from moving to the right when viewed as in FIG. 9. Thus, when the trip lever is switched to move the device out of the position in which it locks the light drag, the trip lever selector switch 600 prevents the device from being pushed back into a position where it could be operated automatically by the turning of the handle of the reel. As shown in this condition in FIG. 10, part 200 will no longer be an interfering relationship to the tracking of the pins 300 on the under surface of the gear face 310. Thus, when that gear is rotated, those pins will simply bypass the part 200. This allows the reeling in of the line by turning the handle without automatically shifting to a position in which the spool shaft is locked.

When one moves this selector switch back, it automatically trips into the automatic mode.

Figure 10:
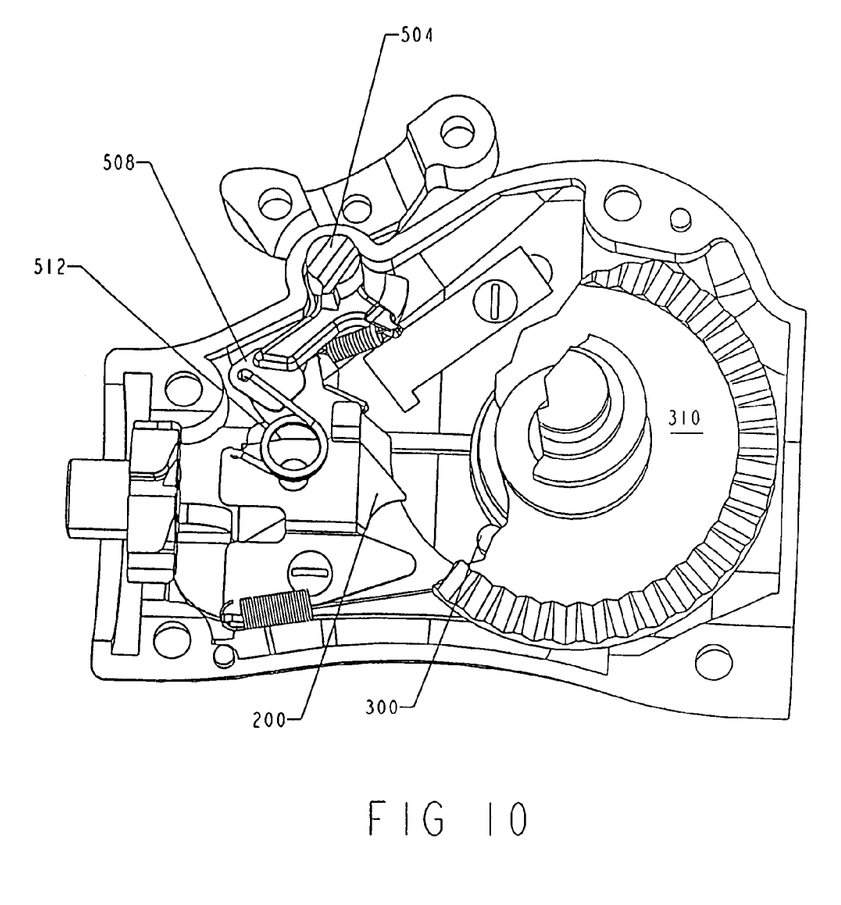
FIG. 10 is a sectional view of a portion of a spinning reel in accordance with my invention showing the parties in an alternate position.

On the other hand, if it is in the automatic mode and you move the switch down and to the left when viewed as in FIG. 10, you move it into the manual mode.

Figure 11:
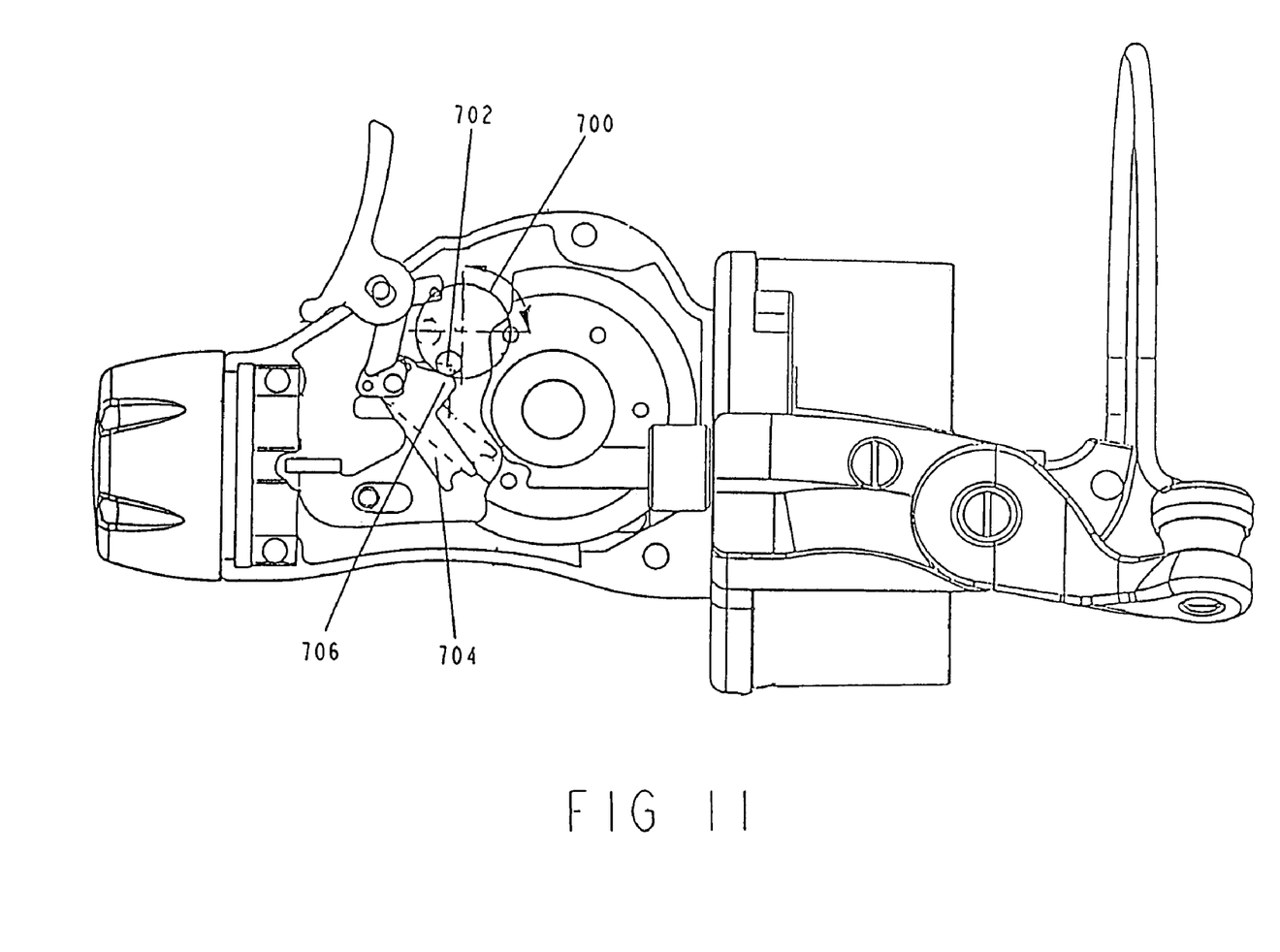
FIG. 11 is a cross-sectional view of an apparatus in accordance with an alternative embodiment of my invention.
Figure 12:
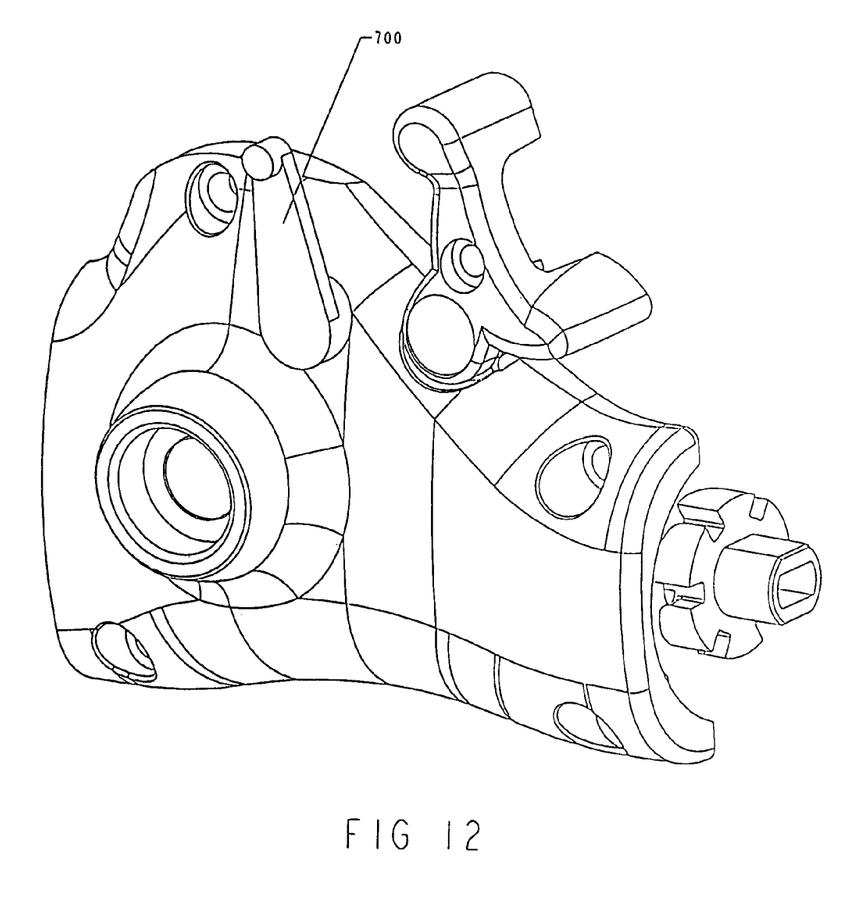
FIG. 12 is a perspective view of the reverse side of that apparatus shown in FIG. 11.

In the alternate embodiment shown in FIGS. 11 and 12, a rotating handle 700 can be mounted through the frame of the reel in any suitable manner so as to rotate the pin 702 mounted on the end of the extension of the handle as shown in FIG. 11. The pin can be rotated from the position shown in phantom lines to the position shown in solid lines. The pin will engage the nose 706 of the part 704 (which is similar to the part 200 previously described). In this manner, the same functions as described immediately herein above can be performed. This alternate embodiment shows that this can be done by a rotational switch means similar to the way it was done by a linear or sliding switch means previously described.

Figure 13:
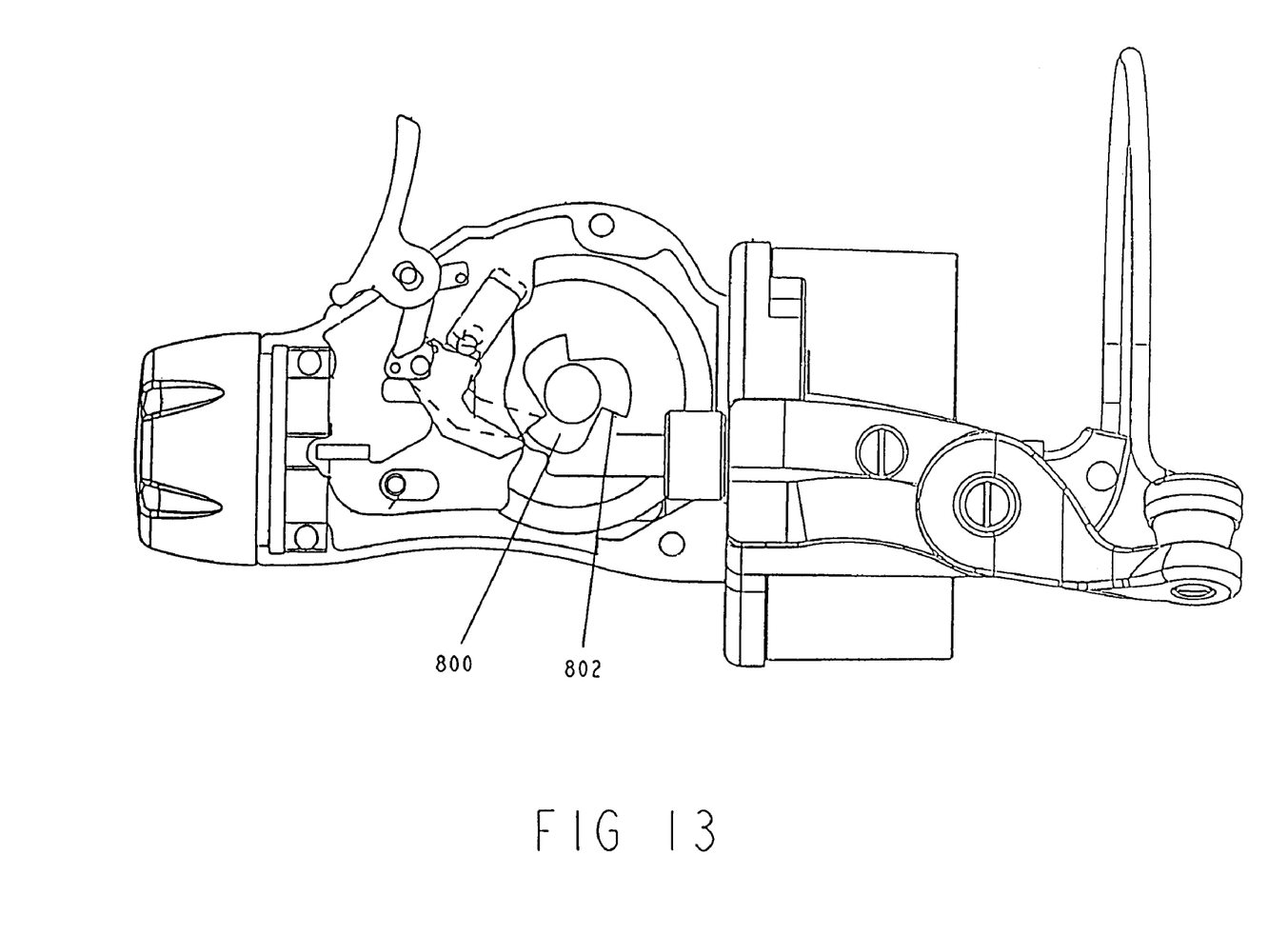
FIG. 13 is a cross-sectional view of another alternate embodiment of my invention.

A further alternate embodiment of my invention is shown in FIG. 13. Therein the pins on the gear (which had been previously described) are replaced by a plurality of teeth 802 on a rotatable trip means 800. Here again, the functions of tripping the trip arm by means of this manual trip means can be accomplished.

Figure 14:
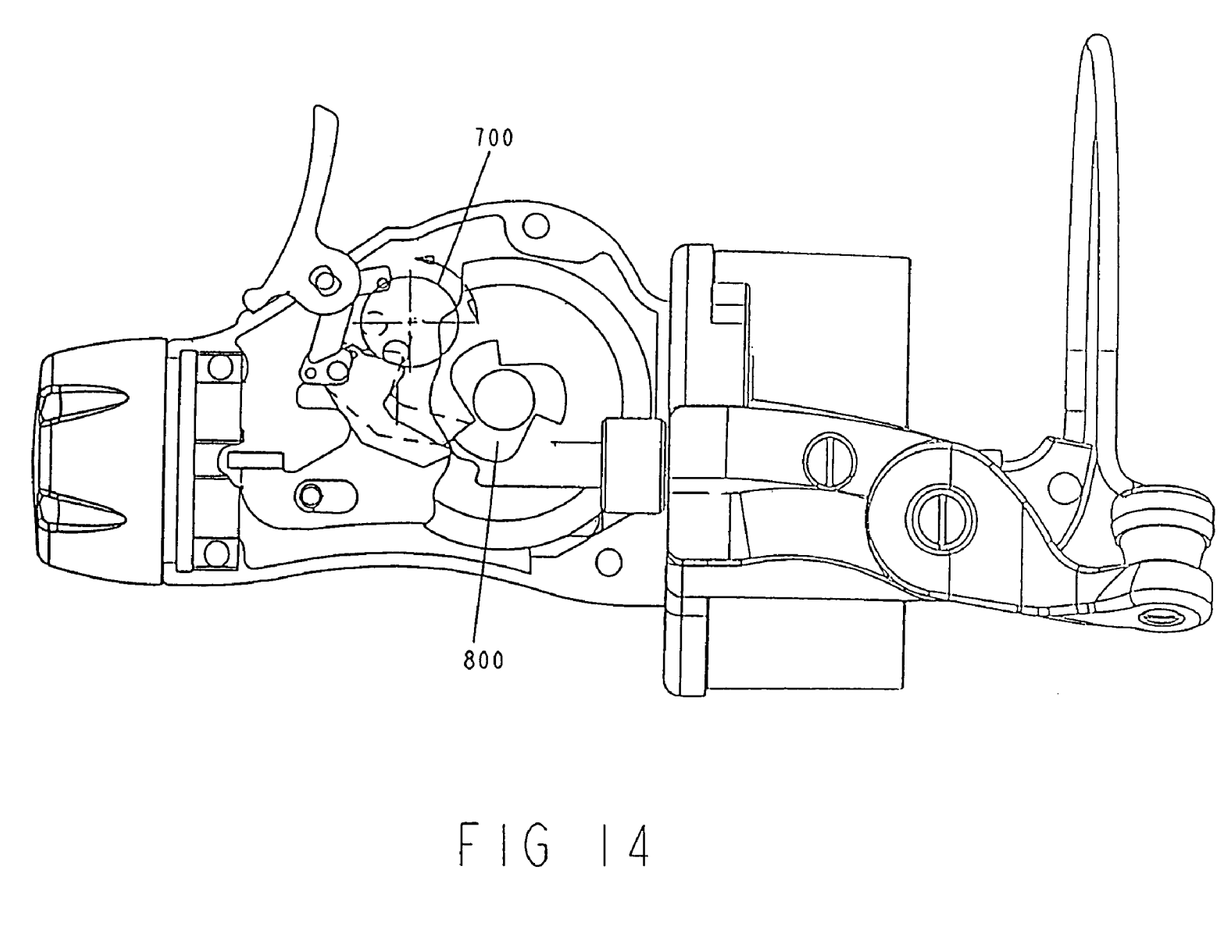
FIG. 14 is a cross-sectional view of yet another alternate embodiment of my invention.

In the further alternate embodiment shown in FIG. 14, I have combined both the trip tooth means and the rotating pin 702. In this alternate embodiment, even when the trip mode switch is in the automatic mode, the trip lever can be tripped manually to alternate between heavy and light drag systems.

What is claimed is:

1. In a spinning type fishing reel, having at least a spool shaft and a spool mounted thereon, a crank to turn a rotor frame around the spool and reel in a fishing line onto the spool, and a drag means to apply drag to the spool; said reel also having at least the following modes of operation:
   a. a free spool shaft operative mode; and
   b. a locked spool shaft operative mode wherein the spool shaft is locked, but there is an adjustable amount of drag which may be placed on the spool between the spool and the spool shaft; and
   a switch means which can be tripped manually to put the reel in the free spool shaft operative mode or the locked shaft operative mode; and
   an automatic actuating means to automatically put the spool shaft in the locked spool shaft operative mode upon rotation of the crank, the improvement comprising:
   a trip mode selector switch means for disengaging the automatic actuating means and allowing the reel to be cranked to reel in line in the free spool shaft operative mode.

2. The reel of claim 1 wherein a light adjustable drag means is provided to apply drag to the spool shaft in the free spool shaft operative mode.

3. The reel of claim 1 wherein the trip mode selector switch means comprises a sliding switch means.

4. The reel of claim 1 wherein the trip mode selector switch means comprises a rotational switch means.

5. The reel of claim 1 wherein the automatic actuating means has a gear with pins extending from a surface thereof to engage a lever upon rotation of the gear and move that lever to automatically put the spool shaft in the locked operative mode upon rotation of the crank.

6. The reel of claim 1 wherein the automatic actuating means has a rotatable trip means with a plurality of teeth to engage a lever upon rotation of the rotatable trip means and move that lever to automatically put the spool shaft in the locked operative mode upon rotation of the crank.

7. The reel of claim 1 wherein the trip mode selector switch means comprises a rotational switch means and the automatic actuating means has a rotatable trip means with a plurality of teeth to engage a lever upon rotation of the rotatable trip means and move that lever to automatically put the spool shaft in the locked spool shaft operative mode upon rotation of the crank.

8. In a spinning reel for fishing, comprising:
   a casing;
   a main gear;
   a handle shaft arranged to turn the main gear of the reel;
   a spool shaft defining a first axial end and a second axial end, said spool shaft being reciprocal in an axial direction, a spool provided at said first axial end of the spool shaft mounted on the spool shaft by a front drag assembly, and a block fixed rotationally with respect to the spool shaft and located at the second axial end of the shaft, opposite to the first axial end;

a rotor for winding fishing line onto said spool;

a switching means for selectively engaging the spinning reel between a first state being a main drag condition, in which the spool shaft is prevented from rotating relative to the casing, and a second state being a free spool shaft state in which the spool shaft may be substantially free to rotate;

the switching means including a switch mechanism, said switch mechanism including a plate which is mounted to move parallel to the axial direction of the spool shaft, between a first and a second stable position, said plate defining an engagement means at one of its ends;

wherein when said switch mechanism is in the first of the two stable positions, the engagement means engages with a mating engagement means in the block to prevent rotation of the block and the spool shaft relative to the switch means and the casing to cause the spinning reel to be in the main drag condition; and wherein the switch mechanism is movable to the second stable position in which the engagement means is disengaged from the mating engagement means in the block, and the block and spool shaft are free to rotate relative to the switch means to cause the spinning reel to be in the free spool shaft state; and further comprising a return means associated with the main gear of the reel for switching the spool from the free spool shaft state to the main drag condition when the handle shaft is rotated in a direction to reel fishing line onto the spool; the improvement comprising:

a trip mode selector switch means for disengaging the automatic function means and allowing the reel to be cranked to reel in line in the light drag mode.

9. In a spinning type fishing reel having:

a reel body;

a rotary frame supported rotatably to said reel body;

a spool supported on a spool shaft;

a drag mechanism for applying a resistance against rotation of said spool on said shaft;

a changeover control mechanism for changing over said drag mechanism between an operating state in which said spool is subjected to a rotational resistance applied by said drag mechanism and a free spool shaft state to enable said spool to be freely rotatable;

a return mechanism which, when said drag mechanism is released from said operating state, automatically restores said changeover control mechanism from a condition causing said drag mechanism to occupy said operation releasing state to a condition causing said drag mechanism to occupy said operating state, following rotation of said rotary frame;

a master gear for driving said rotary frame;

at least one kick member rotatably driven together with said master gear; the improvement comprising:

a trip mode selector switch means for disengaging the automatic restoration and allowing the reel to be cranked to reel in line in the free spool state.

* * * * *